(12) United States Patent
Nakamura et al.

(10) Patent No.: US 6,937,484 B2
(45) Date of Patent: Aug. 30, 2005

(54) INVERTER CONTROLLED GENERATOR APPARATUS

(75) Inventors: Masashi Nakamura, Saitama (JP); Motohiro Shimizu, Saitama (JP); Kazufumi Muronoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 10/732,317

(22) Filed: Dec. 11, 2003

(65) Prior Publication Data

US 2004/0120167 A1 Jun. 24, 2004

(30) Foreign Application Priority Data

Dec. 20, 2002 (JP) .................................... P 2002-370864

(51) Int. Cl.[7] .............................. H02M 5/45; H02H 7/06
(52) U.S. Cl. .............................. 363/36; 363/37; 322/28; 290/45
(58) Field of Search .............................. 363/36, 37, 56, 363/95–98, 132, 131, 57–58; 322/22–25, 17, 28, 29, 90; 290/45–48

(56) References Cited

U.S. PATENT DOCUMENTS

| | | | | |
|---|---|---|---|---|
| 5,077,485 A | * | 12/1991 | Rashid | ........................ 307/84 |
| 5,081,365 A | * | 1/1992 | Field et al. | ..................... 290/45 |
| 5,239,253 A | | 8/1993 | Shimizu et al. | |
| 5,545,928 A | * | 8/1996 | Kotani | ...................... 290/40 C |
| 5,945,808 A | * | 8/1999 | Kikuchi et al. | ............. 320/132 |
| 6,078,508 A | | 6/2000 | Okamura et al. | |
| 6,172,887 B1 | | 1/2001 | Klare et al. | |
| 6,392,312 B1 | * | 5/2002 | Morris | ...................... 290/40 C |
| 2002/0047419 A1 | | 4/2002 | Shimizu et al. | |

FOREIGN PATENT DOCUMENTS

| | | |
|---|---|---|
| JP | 06-121597 | 4/1994 |
| JP | 11-308867 | 11/1999 |
| JP | 11-308896 | 11/1999 |

* cited by examiner

*Primary Examiner*—Rajnikant B. Patel
(74) *Attorney, Agent, or Firm*—Westerman, Hattori, Daniels & Adrian, LLP

(57) ABSTRACT

A plurality of control power sources of voltage specifications different from one another are constructed. A generator output converted by a converter into a DC current is converted by an inverter into an AC current of a predetermined frequency. The generation output is rectified by second rectifier circuits and a capacitor and is then input to an RCC. The RCC constitutes a self-excited oscillation circuit, energy is stored into a transformer in an ON time of a transistor corresponding to an oscillation frequency thereof, and the energy is transferred to a secondary side in an OFF time. In the secondary side of the RCC, windings are formed corresponding to the number of required power sources. One group of windings forms both positive and negative power sources of a control power source, and another group of windings forms a power source for an FET driver.

3 Claims, 4 Drawing Sheets

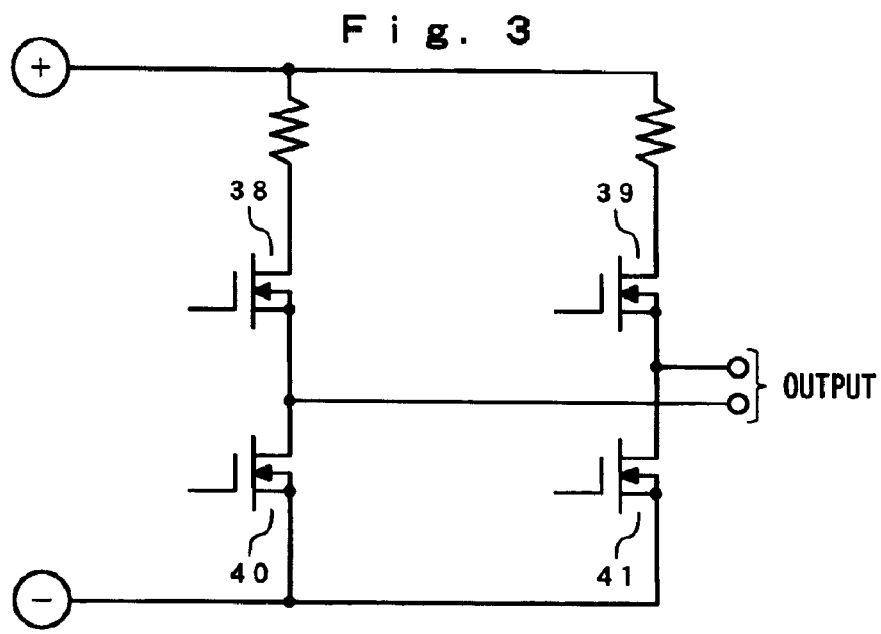
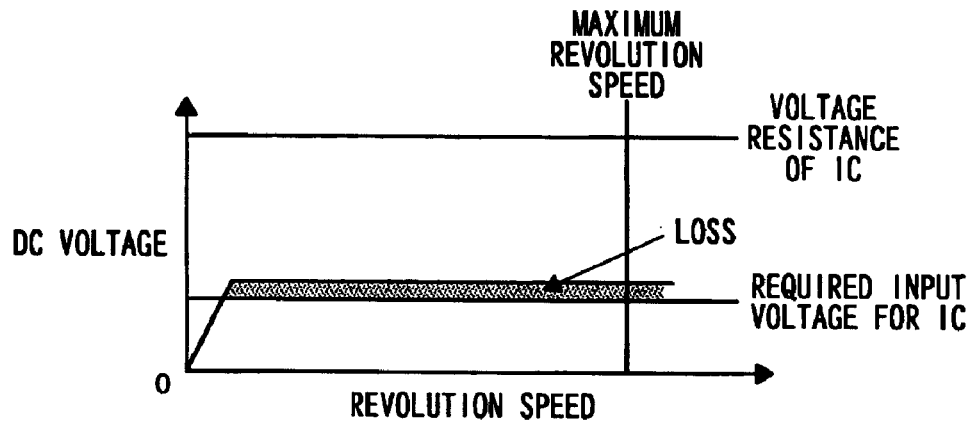
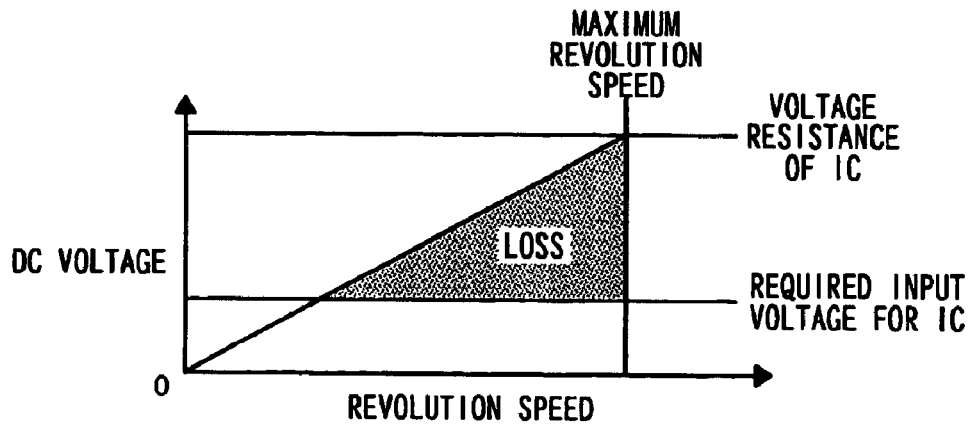

INVERTER CONTROLLED GENERATOR APPARATUS

BACKGROUND OF THE INVENTION

1. Field of the Invention

The present invention relates generally to an inverter controlled generator apparatus, and more specifically to an inverter controlled generator apparatus to which control power source is supplied from outputs of a generator of its own.

2. Description of the Related Art

As a portable power source for outdoor use and an emergency power source, power source apparatuses of the type using an engine driven AC (alternating current) generator are known. A power source apparatus of this type produces an output in the manner that an AC current having been output from an engine-driven generator is converted into a DC (direct current) current. Then, the DC current is converted by an inverter into an AC current having a predetermined frequency such as a commercial frequency, and the AC current is output. In the power source unit of this type, the power source for driving the inverter is supplied from an output of a generator that is driven by an engine. As such, at an initial stage after the start of the engine, the engine revolution speed is low, and hence the output of the generator is not sufficient, so that the power source voltage of the inverter-driving power source is likely to become unstable.

In power source units of the type described above, control itself or the like for maintaining a generation output voltage to be stable by way of analog control in many cases on the one hand, and in many cases, an inverter-driving signal system, engine control, and the like use a microcomputer to perform digital control on the other. This requires the use of, for example, power sources for the digital control, analog control, and power sources for each of a voltage specification, thereby making the power source system to tend to be complex.

For example, according to a generator disclosed in Japanese Unexamined Patent Application Publication No. 06-121597, a power source for a controller is obtained from a transformer secondary output of a primary winding or an auxiliary winding. The generator is designed such that the power source can be secured in the state that the revolution speed range is as low as possible; and taking into account the characteristic of increasing voltage in association with increase in revolution speed, the generator is designed to use a voltage doubling rectification method to implement loss suppression.

In the above-described generator using the voltage doubling rectification method, the transformer output from the winding undergoes voltage doubling rectification, and the power source is formed to use both polarities on the negative and positive sides. As such, in terms of circuit configuration, when setting a power source for a microcomputer to the negative power source, it is difficult to produce the output voltage with high accuracy, thereby creating the cause of increasing nonuniformity of the voltage.

In addition, when an engine-speed controlling electronic governor is mounted, an inverter-controlling power source cannot be secured, so that the electronic governor cannot be started and actuated from a low engine revolution speed range. To enable the electronic governor to be started and operated from the low engine revolution speed range, the number of turns of a power-source dedicated winding or transformer's secondary winding provided in the generator may be increased to increase the voltage. However, this involves an increase in loss in a high revolution speed range and, requires increase in the voltage resistance of a power-source IC.

The situation is similar even in a generator that has a battery as a power source. Even with a battery being provided, engine-driven generator apparatuses are of a portable type or are for emergency use in many cases, so that when the battery is used up, the engine needs to be manually started by using, for example, a recoil starter. As such, the same situation as that in a generator not having a battery needs to be contemplated.

SUMMARY OF THE INVENTION

An object of the present invention is to provide an inverter controlled generator apparatus capable of securing a plurality of independent control power sources of specifications different from one another.

The first feature of this invention is that an inverter controlled generator apparatus having a generator to be driven by an engine, a first rectifier circuit that rectifies an alternating current which is outputted from the generator, and an inverter circuit that converts a direct current which is outputted from the first rectifier circuit into an alternating current having a predetermined frequency and that outputs the alternating current, the inverter controlled generator comprising: a second rectifier circuit that rectifies an alternating current which is output from the generator; and a self-excited oscillation converter of which a primary side is connected to an output side of the second rectifier circuit, wherein a secondary side of the self-excited oscillation converter is connected as a control power source to the inverter circuit.

The second feature of this invention is that the control power source is constructed such that both positive and negative power sources are formed by coupling a plurality of independent secondary-winding outputs of the self-excited oscillation converter.

The third feature of this invention is that the control power source is constructed to include a power source for an electronic governor that controls a revolution speed of the engine.

According to first to third features described above, the power sources are formed with the outputs from the second rectifier circuits provided as a system independent from the first rectifier circuit, so that no event occurs in which the control power source cannot be secured even when a malfunction occurs in the first rectifier circuit. In addition, since the self-excited oscillation converter is used, the plurality of independent power sources with which voltages is different and insulated from one another. Concurrently, according to the control of the oscillation frequency and duty, even when a primary input voltage has increased, a secondary output voltage can be controlled not to increase. Consequently, a stabilized output, that is, an output voltage not increasing further than necessary, can be drawn from the secondary side, and the voltage rise can be accelerated.

According to a second feature, positive and negative power sources for digital device such as a CPU can be configured by overlapping the independent secondary-winding outputs. Accordingly, using only a positive-power-source IC that has higher accuracy in comparison to the negative-power-source IC can configure the control section. This consequently enables the suppression of detection-voltage measurement errors attributable to the power source accuracy.

According to a third feature, the electronic governor can be actuated by the power source secured from a relatively low engine revolution speed range, immediately after the engine start, not by a power source supplied from the output of the inverter. This enables the electronic governor to be actuated even in a low engine revolution speed range. Consequently, the electronic governor can be actuated from the state of, for example, a low revolution range after the engine start, thereby enabling the revolution speed control to be implemented with even higher accuracy.

BRIEF DESCRIPTION OF THE DRAWINGS

FIG. 3 is a circuit diagram of an inverter circuit;

FIGS. 5A and 5B are views each showing the relationship between the engine revolution speed and the output voltage of an RCC (ringing choke converter).

DETAILED DESCRIPTION OF THE PREFERRED EMBODIMENTS

Figure 2:
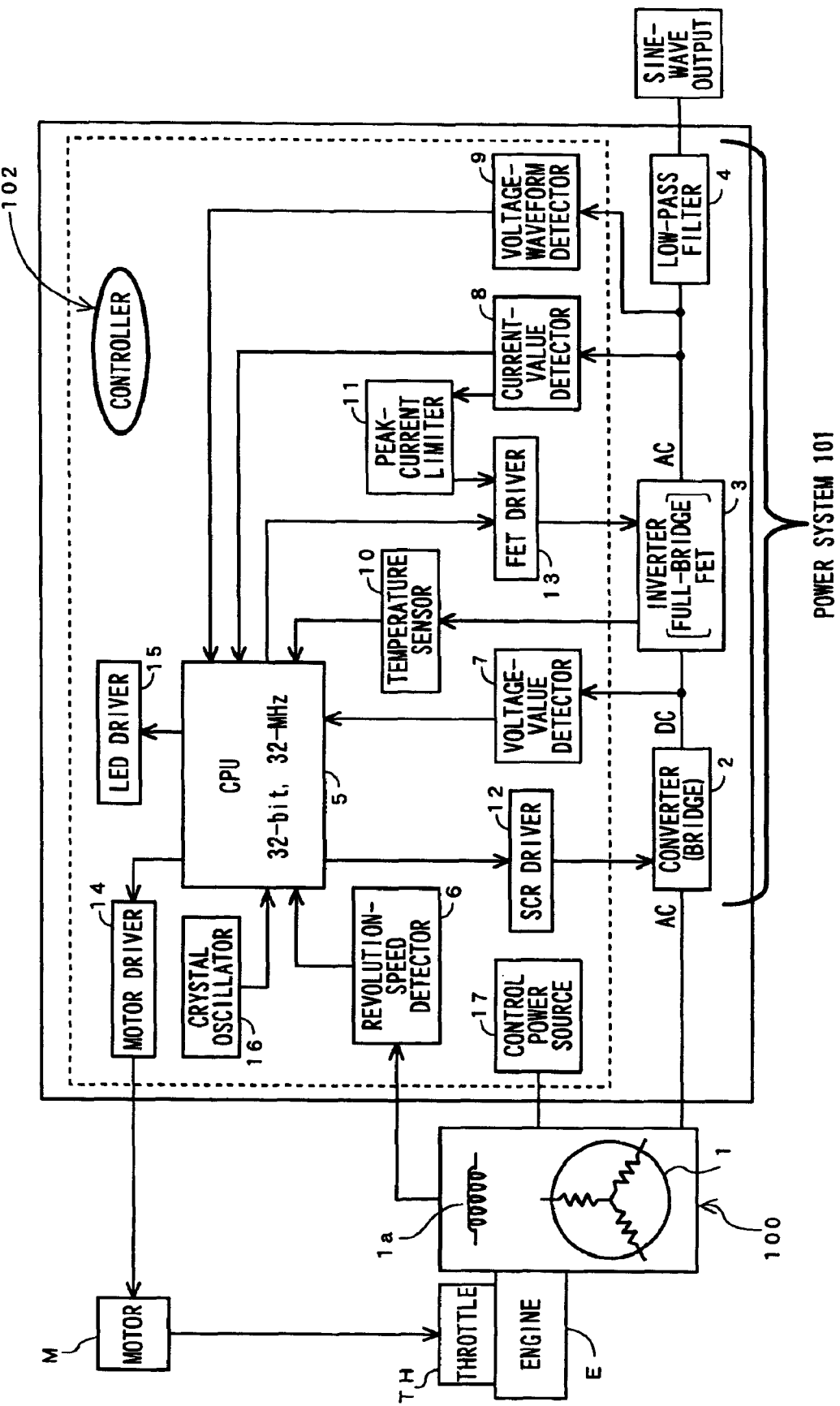
FIG. 2 is a block diagram showing the configuration of the engine generator according to the embodiment of the present invention.

An embodiment of the present invention will be described herein below in detail with reference to the drawings. FIG. 2 is a block diagram showing the configuration of the engine generator apparatus according to the embodiment of the present invention. A generator 100 has a rotor (not shown) driven by an engine E and a stator (not shown). The stator has a three-phase output winding 1 and a single-phase auxiliary winding 1a wounded thereon. A stepping motor M is provided to control the opening of a throttle valve TH of the engine E.

The rotor (not shown) of the generator 100 has a multi-polar permanent magnet. When the engine E drives the rotor, the three-phase output winding 1 outputs an AC current at a frequency determined corresponding to the engine revolution speed. An output AC current of the three-phase output winding 1 is inputted to a DC power source circuit, namely a converter 2 in which the current is converted into a DC current. The DC current having been output from the converter 2 is inputted to a switch device, namely an inverter 3 in which the current is converted by an FET bridge circuit, which constitutes the inverter 3, into an AC current having a predetermined frequency such as a commercial frequency. The AC current having been outputted from the inverter 3 is inputted to a low-pass filter 4, in which a low frequency component (commercial frequency component in the present case) of the AC current passes through the low-pass filter 4 and is output as an AC power of a predetermined frequency.

A controller 102 for controlling the engine E and a power system 101 formed of the converter 2, the inverter 3, and the low-pass filter 4 is configured as described hereunder. The controller 102 has a 32-bit, 32-MHz central processing unit 5 (CPU) that executes the overall processing for the aforementioned control. The CPU 5 operates using an output pulse of a crystal oscillator 16 as a clock pulse. A control power source 17 of the controller 102 is formed in accordance with the AC current generated by the three-phase output winding 1. This will be described in detail later.

Data necessary for operations of the CPU 5 are detected by individual detection sections described hereunder. The engine revolution speed is detected by a revolution-speed detector 6 in accordance with the frequency of an AC output voltage of the auxiliary winding 1a. As state detection means of the power system 101, there are provided a voltage-value detector 7 for detecting a DC output voltage of the converter 2, namely, an input voltage of the inverter 3; a current-value detector 8 for detecting an output current of the inverter 3; a voltage-waveform detector 9 for detecting an output voltage waveform which is output from the inverter 3; temperature sensor 10 for sensing the temperature of the inverter 3; and a peak-current limiter 11 for protecting the inverter 3 from an over current.

The converter 2 is configured of a rectifier circuit having thyristors (SCRs) coupled in the form of a bridge circuit, so that there are provided an SCR driver 12 for controlling gate signals of the thyristors, an FET driver 13 working as a switching control circuit to control an FET of each arm of the bridge circuit formed in the inverter 3, a motor driver 14 for controlling the stepping motor M, and an LED driver 15 for energizing LEDs provided to perform various display operations. In response to the data detected by, for example, the detectors 6, 7, 8, 9, and the sensor 10, the CPU 5 outputs command signals to the individual drivers 12, 13, 14, and 15.

The CPU 5 supplies to the SCR driver 12 a conduction-angle control command for controlling the conduction angle on the thyristors. The conduction angle is determined to control the DC voltage detected by the voltage-value detector 7 to a predetermined value. In response to the command, the SCR driver 12 controls the conduction angle on the thyristors provided in the converter 2. The DC voltage decreases as the load increases. Accordingly, even when the load increases, the DC voltage can be controlled to remain at the predetermined value by increasing the conduction angle on the thyristors. The thyristor conduction angle represents a surplus of the output of the generator 100 against the load. As such, when the engine revolution speed is controlled to enable the thyristor conduction angle to be maintained at an appropriate value, the generator 100 is recognized to be capable of producing the output with an appropriate surplus. In other words, a desired engine revolution speed of the engine E is determined to maintain the conduction angle at the appropriate value so that the generator 100 can operate with the appropriate surplus. The operation of the electronic governor is described in detail in, for example, Japanese Unexamined Patent Application Publication No. 11-308896 under a previous application of the applicants of the present invention.

The CPU 5 outputs to the motor driver 14 a command for controlling the engine revolution speed, which has been detected by the revolution-speed detector 6, to a desired revolution speed. In response to the command supplied from the CPU 5, the motor driver 14 drives the stepping motor M to determine the throttle opening. This operation increases the engine revolution speed when the load increases, thereby controlling the conduction angle on the thyristors provided in the converter 2 to remain at an appropriate value.

The CPU 5 has sine-wave outputting means that outputs a reference sine wave signal at a given frequency (commercial frequency, for example) and pulse-width modulating means that performs pulse-width modulation of the reference sine wave signal to produce a PWM signal. In addition, the CPU 5 has correction-signal calculating means for the reference sine wave signal, which is determined to perform calculations in response to the wave signal detected by the voltage-waveform detector 9 for the reference sine wave signal to enable the output of the low-pass filter 4 to be close to a sine wave with reduced distortions and offset components, for example.

The FET driver 13 has a switching control circuit for controlling the FETs of the inverter 3 to perform a switching operation in accordance with the PWM signal. In response to the PWM signal supplied from the CPU 5, the FET driver 13 drives the FETs to perform switching operation, whereby a DC input of the inverter 3 is output in the form of a sine wave AC current having a predetermined frequency.

The CPU 5 has a breaker function that in accordance with the value detected by the current-value detector 8, stops the output when a current exceeding a predetermined value is continued for a predetermined period of time. In the event that information of the temperature sensed by the temperature sensor 10 is inputted to the CPU 5 and when the information of temperature is higher than a reference temperature determined from the viewpoint of protecting the FETs of the inverter 3, the CPU 5 controls the output of the generator 100 to stop.

Figure 1:
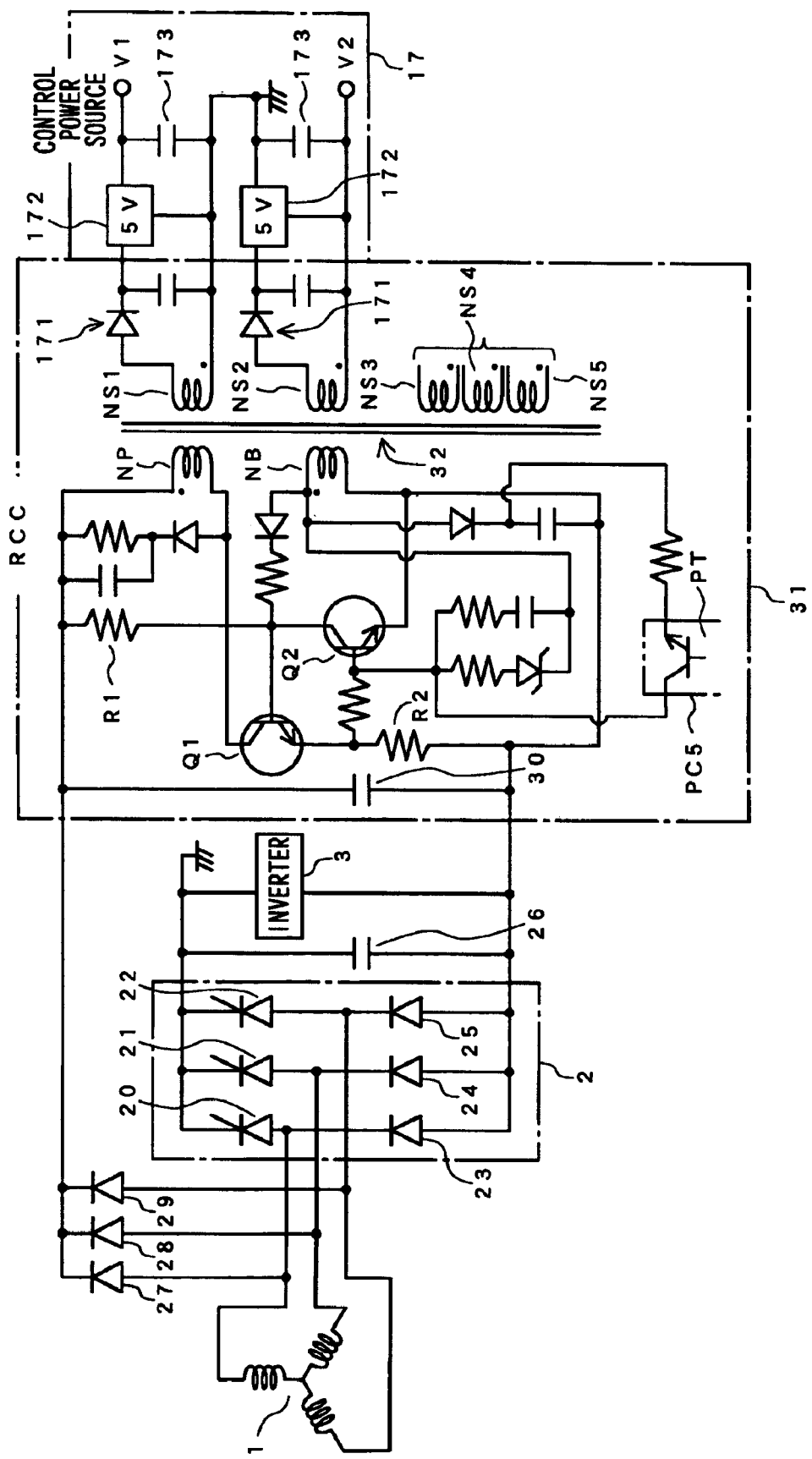
FIG. 1 is a view showing a power source circuit serving as a main portion of an engine generator according to an embodiment of the present invention.

FIG. 1 is a circuit diagram of the engine generator apparatus, showing in detail the configurations of the power source for the CPU 5 and the FET driver 13. The converter 2 is a first rectifier circuit configured of SCRs 20, 21, 22 and diodes 23, 24, 25. A smoothing capacitor 26 is connected to an output side of the converter 2. Diodes 27, 28, 29 are individually connected to the phases of the three-phase output winding 1. An output of the three-phase output winding 1 is rectified by the diodes 27, 28, 29 serving in cooperation as a second rectifier circuit, smoothed by a capacitor 30, and coupled to the primary side of an RCC 31 (ringing choke converter), which is a self-excited oscillation converter.

The RCC 31 has a transformer 32 formed of primary coils NP and NB, secondary coils NS1 and NS2, and secondary coils NS3, NS4, NS5. The primary coils NP and NB are connected to a self-excited oscillation circuit including transistors Q1 and Q2. A photoreceptor element PT of a photocoupler PC5 included in the self-excited oscillation circuit, a shunt regulator provided in the secondary side of the transformer 32, and a light-emitting device (described below in detail) of the photocoupler PC5 together constitute a feedback circuit that controls the secondary side to a constant voltage.

The secondary coils NS1 and NS2 are connected to the control power source 17 that has output terminals V1 and V2. The control power source 17 has two constant voltage supply units each including a rectifier circuit 171, a constant voltage circuit 172, and a smoothing circuit 173. The individual secondary coils NS1 and NS2 are independently connected to the corresponding constant voltage supply units. The two constant voltage control units form a pair of positive and negative power sources having a common ground, and the output terminals V1 and V2 are connected to the controller 102. The configuration described above is used as power sources for digital devices such as the CPU 5, namely, as power sources for switching control of the inverter 3 and the electronic governor that controls the revolution speed of the stepping motor M.

The secondary coils NS3, NS4, NS5 are connected to the FET driver 13 for use as a power source for driving the FETs that constitute the inverter 3.

FIG. 3 is a circuit diagram of the inverter 3. The inverter 3 is a bridge circuit formed of FETs 38 to 41. The FETs 38 to 41 are each driven by a control signal that is inputted to its gate to perform switching and to thereby output an AC current of a predetermined frequency.

Figure 4:
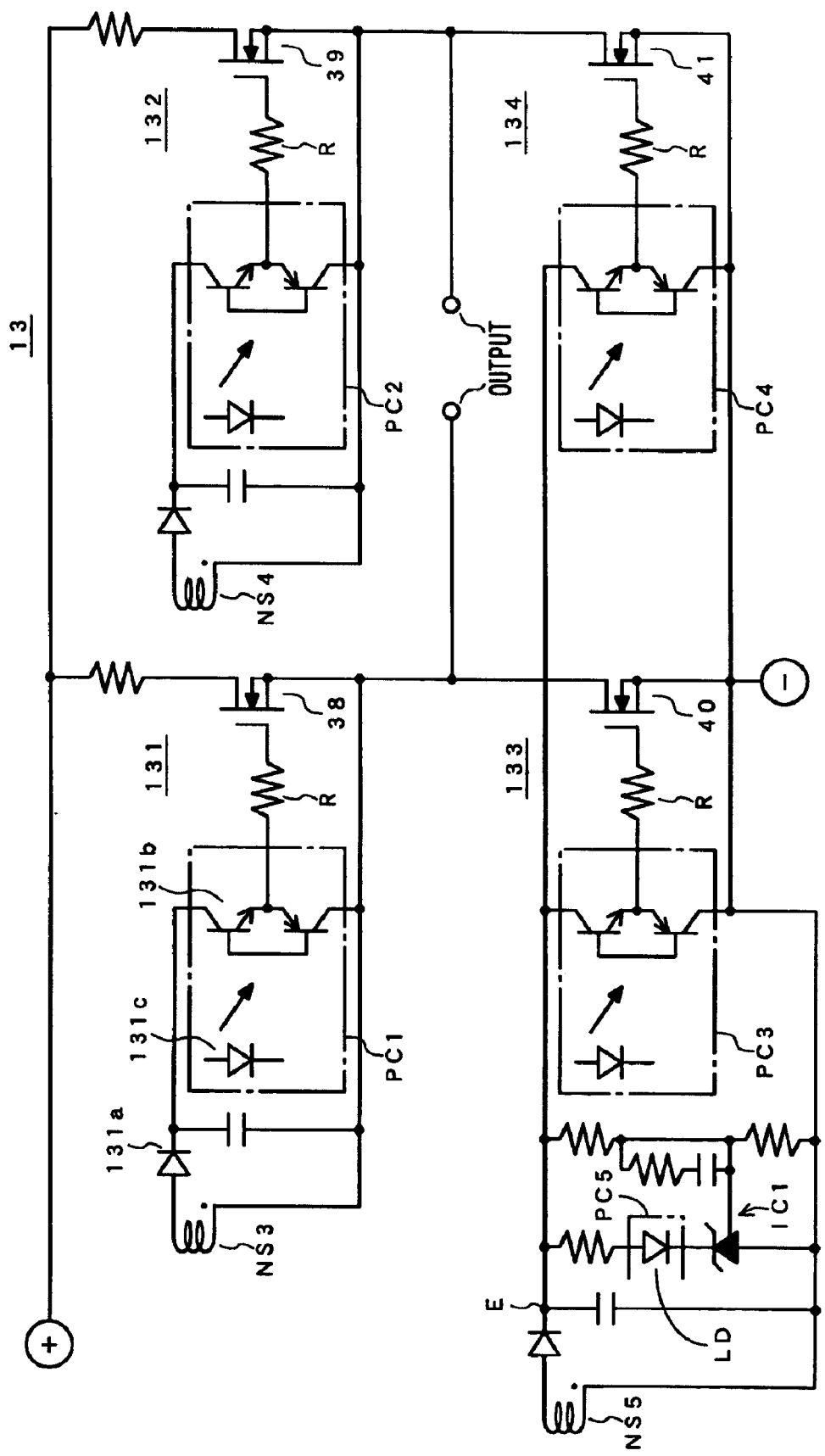
FIG. 4 is a circuit diagram of an inverter circuit driver.

FIG. 4 is a circuit diagram showing connections of the FET driver 13 and the FETs. The FET driver 13 includes driver circuits 131, 132, 133 and 134. Common portions of the driver circuits 131 to 134 will be described hereunder with reference to the driver circuit 131 as a representative. The secondary coil NS3 of the RCC 31 is connected to a rectifier circuit 131*a* of the driver circuit 131. An output of the rectifier circuit 131*a* is coupled to a phototransistor 131*b* that constitute a photoreception section of a photocoupler PC1. An output terminal of the phototransistor 131*b*, i.e., a connection point between the emitter and the collector of the two phototransistors, is connected to the gate of the FET 38 via a resistor R. When a light-emitting diode 131*c* constituting a light-emitting section of the photocoupler PC1 emits light in accordance with a command from the CPU 5, the phototransistor 131*b* conducts, whereby a current supplied from a secondary coil 35 flows through the phototransistor 131*b* to turn on the gate of the FET 38.

In the driver circuit 133, there are provided a light-emitting device LD of the photocoupler PC5 that feeds a secondary voltage back to the primary side, and a circuit IC that includes a shunt regulator. The circuit formed of the light-emitting device LD and the shunt regulator may be provided in any one of the driver circuits 131, 132, 133 and 134.

Operation of the RCC 31 will be described herein below. When a terminal voltage (primary power source voltage) of the capacitor 30 is increased by the outputs of the diodes 27, 28, 29, which constitute the second rectifier circuit, a base current flows to the transistor Q1 via the resistor R1 and thereby turns on the transistor Q1. As a result, the power source voltage is applied to the primary coil NP, and a voltage corresponding to the turn ratio of the coils NP and NB is generated in the primary coil NB. The transistor Q1 is maintained in an on-state according to the voltage generated in the primary coil NB. A collector current of the transistor Q1 keeps increasing up to an instauration range. Then, the voltages of the primary coils NP and NB are reduced, and the base current of the transistor Q1 is reduced, whereby the transistor Q1 is turned off.

When the transistor Q1 turns off, the power stored during an on period of the transistor Q1 causes voltages to be generated in the individual secondary coils NS1 to NS5 corresponding to the individual turn ratios thereof. When the energy stored in the transformer 32 is dissipated from the secondary coils, voltage is induced in the primary coil NB. Then, the voltage causes the transistor Q1 to turn on again. As a result, the power source voltage is again applied to the primary coil NP. Thereafter, the operations are repeated to continually apply voltage to the secondary side of the transformer 32.

In the event described above, while the primary power source voltage is dependent on the engine revolution speed, even with a variation occurring in the primary voltage, the secondary voltage is maintained constant for reasons described hereunder. With increases in the primary voltage and a voltage E of the driver circuit 134, voltage of a cathode electrode of a shunt regulator in a circuit IC1 decreases, and the current of the light-emitting device LD of the photocoupler PC5 increases. Thereby, the current of the photoreceptor element PT of the photocoupler PC5 is increased, and the base current of the transistor Q2 is increased. As a result, the base current of the transistor Q1 decreases, and the transistor Q1 is thereby rendered switchable to the off-state in a short period of time. Thereby, energy to be stored in the transformer 32 is reduced, consequently causing the secondary voltage to decrease. That is, by changing the ON-range (duty ratio) of the transistor Q1, the current increase is suppressed, and consequently, an increase in the secondary voltage is suppressed. A resistor R2 is a shunt resistor that when having encountered the flow of a current exceeding a predetermined level, causes the transistor Q1 to turn off for preventing an over current. In this manner, even when the engine revolution speed has increased, the secondary voltage of the RCC 31 can be maintained to a constant voltage (refer to FIG. 5). Accordingly, even when the secondary voltage is set to boost at a low engine revolution speed, post-boost losses can be reduced, so that operation of the electronic governor in a low revolution speed range can be guaranteed.

Numeric data related to the operation of the engine generator apparatus illustrated in FIG. 2 will be described hereunder by way of example. The generation output is set to 100V, and the revolution speeds are set to 3,300 rpm as a rate engine speed and to 3,600 rpm as a highest engine speed. The revolution speed of the engine E is controlled by the electronic governor to an optimum revolution speed corresponding to the load. When the engine revolution speed has increased to about 800 rpm, the RCC 31 starts its operation. At this time, the primary voltage in the RCC 31 is approximately 70V.

FIGS. 5A and 5B are views each showing the relationship between the engine revolution speed and the secondary voltage of the RCC 31. More specifically, FIG. 5A shows the relationship where constant-voltage control according to the present embodiment has been performed, and FIG. 5B shows the relationship where the constant-voltage control has not been performed. As can be understood from these figures, in the case shown in FIG. 5A, even when the engine revolution speed increases, the secondary voltage (DC voltage) is maintained substantially at a desired voltage, for example, a voltage required for the operation of the IC included in the controller 102. The loss in this case is reduced to a small value. On the other hand, in the case shown in FIG. 5B, with the increase in the engine revolution speed, the DC voltage increases. In this case, for example, design is made so that at the highest revolution speed, the DC voltage increases up to a value close to the voltage resistance of the IC to enable the voltage required for the IC operation to be secured during the state where the rotation speed is as low as possible. Consequently, in this case, a significant loss as shown in the figure is unavoidable.

In the above, while the secondary output voltage of the RCC 31 is fed back to control the oscillation frequency and duty ratio, the means of controlling the oscillation frequency is not limited thereto. For example, the means may be of the type that detects the primary input voltage and controls the oscillation frequency, duty ratio, and the like to vary corresponding to a detected voltage.

In the present embodiment, throttle control in a gasoline engine is assumed. However, the present invention is similarly executable with, for example, a gas fuel supply device for a mixer of a gas engine, a fuel-supply control rack of a diesel engine, and a regulation mechanism equivalent to the throttle valve. In these individual cases, effects similar to those described above can be obtained, and these cases are included in the scope of the present invention.

As evident from the above description, according to the inventions of claims 1 to 3, the plurality of independent power sources of specifications different from one another can be secured at one time in the state that the loss is not increased notwith standing an increase in the engine revolution speed. The power sources are configured as systems different from the first rectifier circuit that supplies the power to the inverter circuit, so that the power sources are not influenced even when a malfunction has occurred in the first rectifier circuit.

According to the invention of claim 2, the individual positive and negative power sources are formed with the independent secondary-winding outputs, so that, generally, compared to a negative-power-source IC, a positive-power-source IC with higher accuracy can be used. This consequently enables the suppression of nonuniformity in the control system using the microcomputer.

According to the invention of claim 3, the engine-speed control by the electronic governor can be implemented from the state of a low engine revolution speed before the control power source of the inverter circuit is secured.

What is claimed is:

1. An inverter controlled generator apparatus having a generator to be driven by an engine, a first rectifier circuit that rectifies an alternating current which is outputted from the generator, and an inverter circuit that converts a direct current which is outputted from the first rectifier circuit into an alternating current having a predetermined frequency and that outputs the alternating current, the inverter controlled generator comprising:

a second rectifier circuit that rectifies an alternating current which is output from the generator; and a self-excited oscillation converter of which a primary side is connected to an output side of the second rectifier circuit, wherein a secondary side of the self-excited oscillation converter is connected as a control power source to the inverter circuit.

2. The inverter controlled generator apparatus according to claim 1, wherein the control power source is constructed such that both positive and negative power sources are formed by coupling a plurality of independent secondary-winding outputs of the self-excited oscillation converter.

3. The inverter controlled generator apparatus according to claim 1, wherein the control power source is constructed to include a power source for an electronic governor that controls a revolution speed of the engine.

* * * * *